(12) United States Patent  (10) Patent No.: US 8,688,669 B1
Bernstein  (45) Date of Patent: Apr. 1, 2014

(54) CONTENT ITEM SEARCHING AND RETRIEVAL

(75) Inventor: Joshua Bernstein, Westfield, NJ (US)

(73) Assignee: Google Inc., Mountain View, CA (US)

( * ) Notice: Subject to any disclaimer, the term of this patent is extended or adjusted under 35 U.S.C. 154(b) by 60 days.

(21) Appl. No.: 13/477,985

(22) Filed: May 22, 2012

(51) Int. Cl.
*G06F 17/30* (2006.01)

(52) U.S. Cl.
USPC .......................................... 707/705

(58) Field of Classification Search
USPC .................................. 707/705, 706
See application file for complete search history.

(56) References Cited

U.S. PATENT DOCUMENTS

| | | | |
|---|---|---|---|
| 6,223,145 B1 * | 4/2001 | Hearst | 703/22 |
| 7,593,932 B2 * | 9/2009 | Lindh et al. | 1/1 |
| 7,707,142 B1 * | 4/2010 | Ionescu | 707/999.003 |
| 2006/0287919 A1 | 12/2006 | Rubens et al. | |
| 2008/0010119 A1 | 1/2008 | Oliveira et al. | |
| 2008/0201216 A1 * | 8/2008 | Almeida | 705/14 |
| 2010/0076841 A1 | 3/2010 | Rajpure et al. | |
| 2010/0281041 A1 * | 11/2010 | Almeida | 707/755 |
| 2011/0125581 A1 | 5/2011 | Jalili | |
| 2012/0254149 A1 * | 10/2012 | Ramsay | 707/709 |
| 2013/0159474 A1 * | 6/2013 | Almeida | 709/219 |

OTHER PUBLICATIONS

Moat Ad Search, http://www.moat.com/, Dec. 14, 2011.

* cited by examiner

*Primary Examiner* — Baoquoc N To
(74) *Attorney, Agent, or Firm* — Fish & Richardson P.C.

(57) ABSTRACT

In one aspect, a method includes receiving, from a user device, a search query including one or more search terms for a content item. The method identifies a corpus of content items previously delivered to the user device, creates an index of the corpus of content items previously delivered to the user device, and uses the received search terms to search the index of the corpus of content items. The method determines that at least one content item in the index corresponds to the received search terms and delivers, to the user device, a content item search result, where the content item search result includes the at least one content item corresponding to the received search terms. Other implementations of this aspect include corresponding systems, apparatus, and computer programs, configured to perform the actions of the methods, encoded on computer storage devices.

17 Claims, 4 Drawing Sheets

CONTENT ITEM SEARCHING AND RETRIEVAL

BACKGROUND

This specification relates to content item searching and retrieval.

Publications (e.g., electronic publications, websites, mobile applications, Internet browser applications, IPTV, digital video, etc.) may include third party content items (e.g., advertisements), for example, to financially support a resource provider's (e.g., publication provider) operations. Some resource providers do not maintain a third party content infrastructure, and thus depend on content serving entities to recruit third party content sponsors (e.g., advertisers, etc.) and to serve the sponsored content items.

SUMMARY

This specification describes technologies relating to searching for and retrieving content items (e.g., advertisements), and in particular content items previously delivered to a device.

In general, one innovative aspect of the subject matter described in this specification can be embodied in methods that include the actions of receiving, from a user device, a search query for a content item. The search query includes one or more search terms. The method identifies a corpus of content items previously delivered to the user device, creates an index of the corpus of content items previously delivered to the user device, and uses the received search terms to search the index of the corpus of content items. The method determines that at least one content item in the index corresponds to the received search terms and delivers, to the user device, a content item search result, where the content item search result includes the at least one content item corresponding to the received search terms. Other implementations of this aspect include corresponding systems, apparatus, and computer programs, configured to perform the actions of the methods, encoded on computer storage devices.

These and other implementations can each optionally include one or more of the following features. The index of the corpus of content items previously delivered to the user device can be populated from a cookie stored at the user device. The received search terms used to search the corpus of content items previously delivered to the user device can be used to search the index of the corpus of content items. Cached copies of the content items included in the corpus of content items previously delivered to the user device may be stored with the index. The content item search result list can be ordered based on a time-stamp of prior delivery of the at least one content item to the user device. The corpus of content items previously delivered to the user device can be delivered by a content item management system.

Particular implementations of the subject matter described in this specification can be implemented so as to realize none, one or more of the following potential advantages. A content item search engine may benefit users and content sponsors by providing a user with the ability to locate and view content items previously delivered or presented to a user device. For example, a user may navigate to a content item search engine and enter terms related to a desired content item. The content item search engine may use these search terms, and other data, to locate content items previously delivered to the user device and present the content items to the user again.

Details of one or more implementations of the subject matter described in this specification are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

Overview

A content item search engine may benefit users and content sponsors by providing a user with the ability to locate and view content items previously delivered or presented to a user device. For example, content items (e.g., advertisements) may be presented alongside content of a publication (e.g., electronic publication, website, mobile application, Internet browser application, IPTV, digital video, etc.). One or more of the content items may be of particular interest to a user viewing the publication. However, before the user is able to interact with (e.g., click, select, etc.) the content item for further inquiry, the user may navigate away from the publication. For example, the user may navigate a web browser to a different webpage of a website. Such navigation generally results in a new set of content items being presented to the user. However, the user may still desire to interact with the content items from the previous webpage. The use of a content item search engine may allow the user to locate content items previously presented or delivered to the user device. For example, a user may navigate a web browser to a content item search engine and enter terms related to a desired content item. The content item search engine may use these search terms, and other data, to locate content items previously delivered to the user device and redeliver the content items to the user device.

Example Operating Environment

Figure 1:
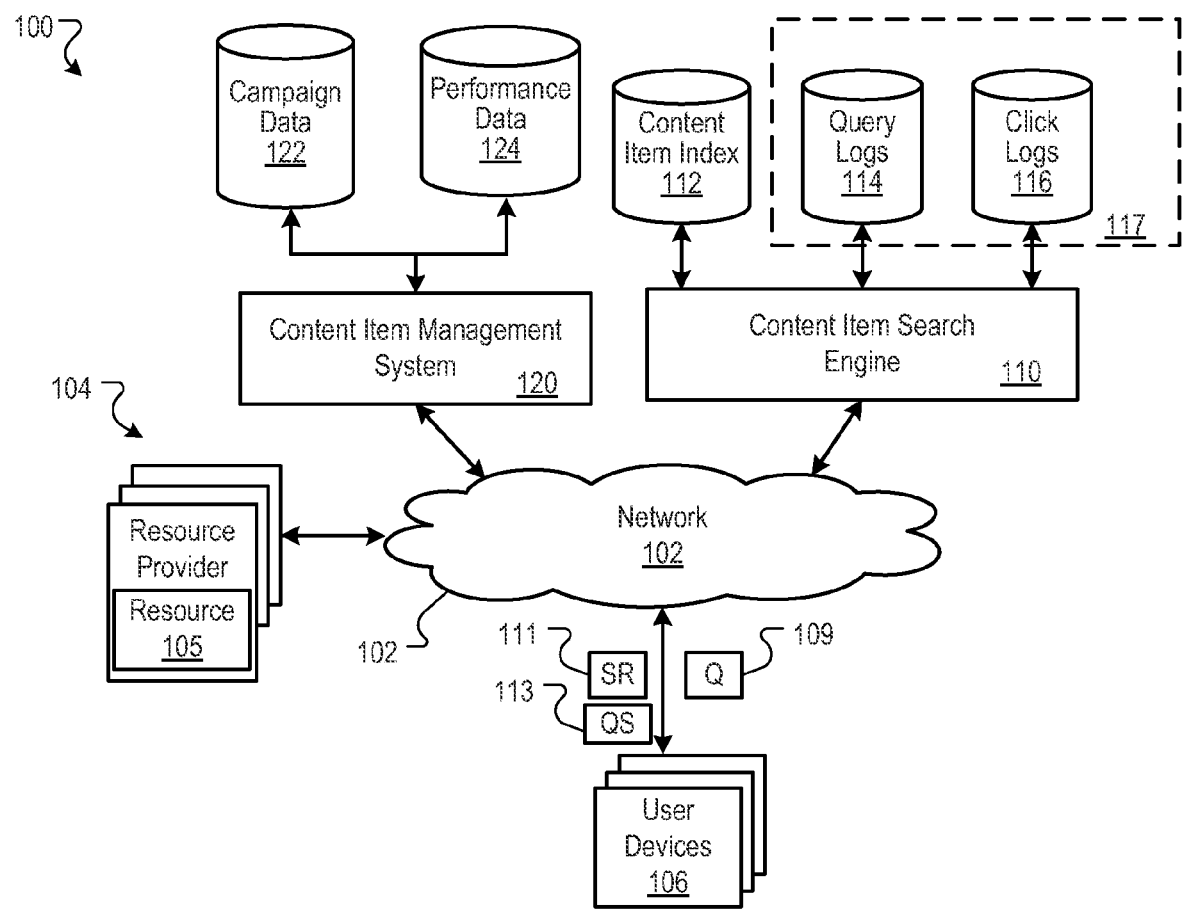
FIG. 1 is a block diagram of an example environment in which a content item search engine provides search services.

FIG. 1 is a block diagram of an example environment 100 in which a content item (e.g., advertisement) search engine 110 provides search services. A computer network 102, such as a local area network (LAN), wide area network (WAN), the Internet, or a combination thereof, connects resource provider (e.g., a publication provider) publications 104 (e.g., electronic publications, websites, mobile applications, Internet browser applications, IPTV, video, etc.), user devices 106, and the content item search engine 110, and a content item management system 120. The environment 100 may include many thousands of resource provider publications 104 and user devices 106.

In some implementations, a publication 104 includes one or more resources 105 associated with a domain name and hosted by one or more servers. For example, a publication can be a collection of web pages formatted in hypertext markup language (HTML) that can contain text, images, multimedia content, and programming elements, such as scripts. Each publication 104 is maintained by a resource provider which is an entity that controls, manages and/or owns the publication 104.

A resource is any data that can be provided by the resource provider over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A user device 106 is an electronic device that is under the control of a user and is capable of requesting and receiving resources and content items over the network 102. Example user devices 106 include personal computers, mobile communication devices, tablet computers, and other devices that can send and receive data over the network 102. A user device 106 typically includes a user application, such as a web browser, to facilitate the sending and receiving of data over the network 102. The web browser can enable a user device to display and interact with text, images, videos, music and other information typically located on a web page at a website on the world wide web or a local area network. In some implementations, a user application may be a mobile application, an Internet browser application, IPTV, a digital video player application, or the like.

The content item management system 120 facilitates the provisioning of content items with the resources 105. In particular, the content item management system 120 allows content sponsors (e.g., advertisers, etc.) to define selection rules that take into account attributes or historical information associated with users to provide a selection of relevant content items to the users. Example selection rules include keyword selection, in which content sponsors provide bids for keywords that are present in either search queries or publication content. Content items that are associated with keywords having bids that result in a content item slot being awarded in response to an auction are selected for displaying in the content item slots.

When a user of a user device 106 selects a content item, the user device 106 generates a request for a landing page of the content item, which is typically a publication of the content sponsor. For example, the resource provider publications 104 may include content items from content sponsors, each hosting respective publications, some of which are landing pages for the content items of the content sponsors.

These selected content items can be provided for many different resources, such as the resources 105 of the resource provider publications 104, and on a search results page resource. For example, a resource 105 from a resource provider publication 104 can include instructions that cause the user device to request content items from the content item management system 120. The request includes a publisher identifier and, optionally, keyword identifiers related to the content of the resource 105. The content item management system 120, in turn, provides selected content items to the particular user device.

The content item management system 120 includes a data storage system that stores campaign data 122 and performance data 124. The campaign data 122 stores content items, selection information, and budgeting information for content sponsors. The performance data 124 stores data indicating the performance of the content items that are served. Such performance data can include, for example, click through rates for content items, the number of impressions for content items, and the number of conversions for content items. Other performance data can also be stored.

The campaign data 122 and the performance data 124 are used as input parameters to a content item auction. In particular, the content item management system 120, in response to each request for content items, conducts an auction to select content items that are provided in response to the request. The content items are ranked according to a score that, in some implementations, is proportional to a value based on a content item bid and one or more parameters specified in the performance data 124. The highest ranked content items resulting from the auction are selected and provided to the requesting user device.

To facilitate searching for content items, content item search engine 110 can maintain content item index 112. In some implementations, content item search engine 110 can be part of a broader search engine (e.g., Google.com). In some implementations, content item index 112 is an index of content items previously delivered by content item management system 120 to a user device 106. For example, an index of content items previously delivered to a user device can be obtained from a cookie associated with a user device. In some implementations, content item search engine 110 can maintain a database of cached copies of the content items. For example, in addition to storing an index of content items, content item index 112 can include corresponding cached copies of the indexed content items.

The user devices 106 submit content item search queries 109 to the content item search engine 110. The content item search queries 109 are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or a user of the user device.

In response to the search request, the content item search engine 110 uses the content item index 112 to identify content items that are relevant to the content item search queries 109. The content item search engine 110 identifies the relevant content items in the form of search results 111 and returns the search results to the user devices 106 in a content items search results page resource. A search result is data generated by the content item search engine 110 that identifies content items that satisfy a particular search query, and includes a content item locator for the resource. An example search result can include a listing of content items. In some implementations, the content items included in the listing can be delivered to a user device in the same or similar manner as they were previously delivered to the user device.

The search results are ranked based on scores related to the content items identified by the search results, such as information retrieval ("IR") scores, and optionally a separate ranking of each content item relative to other content items (e.g., an authority score). The search results are ordered according to these scores and provided to the user device according to the order. In some implementations, the search results are ordered according to a timestamp of when the content items included in the results were previously delivered to the user device. For example, the content items most recently delivered to the user device can be ranked or ordered higher than content items with a older delivery timestamp.

The user devices 106 receive the content item search results pages and render the pages for presentation to users. In response to the user selecting a content item in the search result at a user device 106, the user device 106 requests the content item identified by the selected search result. The content sponsor of the requested content item receives the request for the content item from the user device 106 and provides resources to the requesting user device 106.

Click data for the queries 109 and the content items referenced by the search results are stored in click logs 116. The query logs 114 and the click logs 116 define search history data 117 that include data from and related to previous search requests associated with unique identifiers. The click logs define actions taken responsive to search results provided by the content item search engine 110. The query logs 114 and click logs 116 can be used to map queries submitted by the user devices to publications that were identified in search results and the actions taken by users (i.e., that data are associated with the identifiers from the search requests so that a search history for each identifier can be accessed). The click logs 116 and query logs 114 can thus be used by the content item search engine 110 to determine the sequence of queries submitted by the user devices, the actions taken in response to the queries, and how often the queries are submitted.

Figure 2:
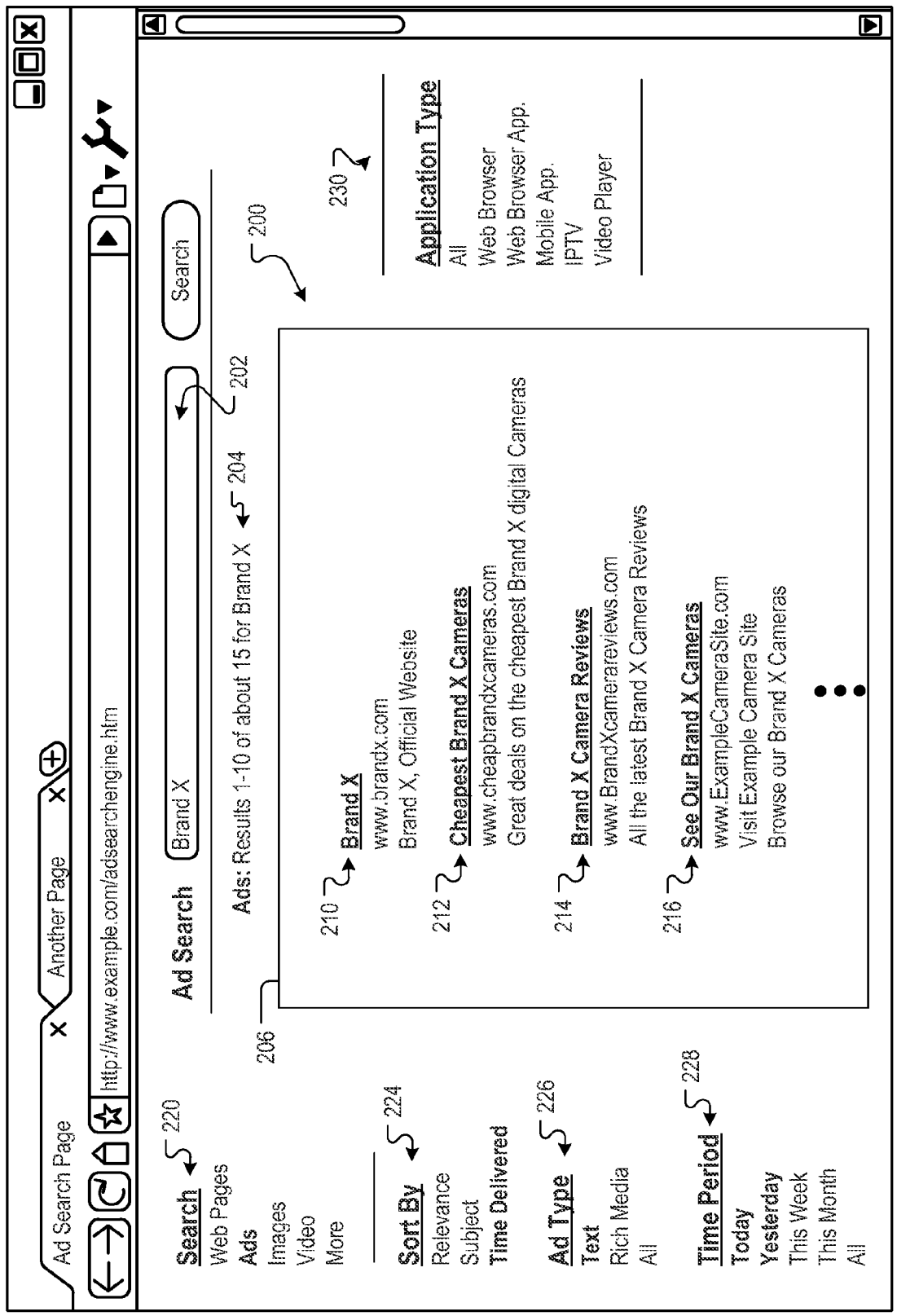
FIG. 2 is a user interface of an example content item search engine.

FIG. 2 is a user interface 200 of an example content item search engine (e.g., content item search engine 110). User interface 200 includes content item search bar 202. Content item search bar 202 is configured, for example, to receive input of search terms from a user of a user device. User interface 200 includes a search results summary 204. In some implementations, search results summary 204 indicates how many content items the content item search engine determined were relevant to the search terms received in content item search bar 202. For example, the content item search engine may employ any suitable algorithm to determine whether content items are relevant, or match content items to content item search terms. User interface 200 includes content item search results 206. Content item search results 206 may include any suitable number of content items 210, 212, 214, and 216. Content items 210, 212, 214, and 216 are content items determined by content item search engine as relevant to, or matching, the search terms received in content item search bar 202. In some implementations, content items 210-216 are content items that have previously been delivered to a user (e.g., by content item management system 120). For example, a user may be interacting with user interface 200 through a web browser. The web browser, or another application, may maintain a listing of previously delivered content items to the user device (e.g., in a cookie). Upon submitting a search using content item search bar 202, the content item search engine can utilize the cookie to search through the content items previously delivered to the user device and locate previously delivered content items relevant to the search terms.

User interface 200 can include search navigation 220. In some implementations, search navigation 220 allows a user to navigate to other search engines. For example, a user may navigate between a "web pages" search engine, an "images" search engine, a "video" search engine, etc. User interface 200 can include sort by option 224. In some implementations, sort by option 224 allows a user to sort, or rearrange, the order in which content items 210-216 are displayed in content item search results 206. For example, a user may elect to sort content items 210-216 by "Time Delivered." That is, content items 210-216 would be ordered in content item search results 206 in the order (e.g., most recent) in which they were delivered to the user device. Sort by option 224 may include other sorting options, for example, "relevance" or "subject." If relevance is selected, content items 210-216 may be ordered in content item search results 206 in an order determined by the content item search engine. For example, content items 210-216 may be ordered with the most relevant content item on the top and the least relevant content item on the bottom.

User interface 200 can include content item type filter 226. In some implementations, content item type filter 226 can be utilized so that only text content items are displayed in content items search results 206, so that only rich media content items are displayed in content item search results 206, or a combination of text and rich media content items are displayed in content item search results 206. User interface 200 can include time period filter 228 to filter content items based on a time when they were delivered to a user device. For example, time period filter 228 may filter content items displayed in content item search results 206 based on content items that were viewed by the user today, yesterday, this week, this month, etc.

User interface 200 can include application type filter 230. In some implementations, application type filter 230 can be utilized to filter content item search results 206 based on an application type where content items were delivered to the user device. For example, the results in content item search results 206 can be filtered to include only content items that were delivered to a web browser, a web browser application, a mobile application, IPTV, a digital video player, and the like.

Figure 3:
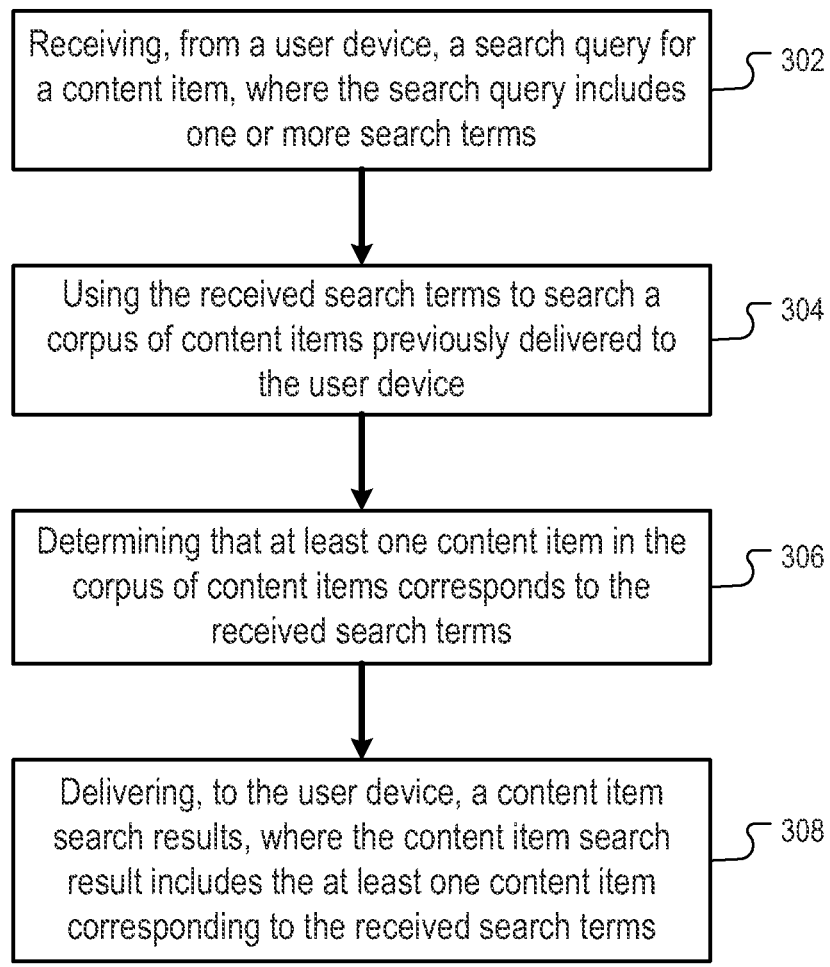
FIG. 3 is a flowchart of an example process performed by a content item search engine.

FIG. 3 is a flowchart of an example process 300 performed by a content item search engine (e.g., content item search engine 110). At 302, a content item search engine can receive (e.g., from a user device 106), a search query for a content item (e.g., using content item search bar 202). The received search query can include one or more search terms related to a desired content item. At 304, the content item search engine can use the received search terms to search a corpus of content items. In some implementations, the content item search engine can exclusively search a corpus of content items previously delivered to the user device. For example, the content item search engine can search an index of content items created from a cookie maintaining a record of content items delivered to the user device. At 306, the content item search engine can determine whether the content items included in the searched corpus of content items are relevant to the received search terms. At 308, the content item search engine can deliver, to the user device, results of the content item search. For example, the content item search engine can deliver content item search results 206 including content items 210, 212, 214, and 216.

Additional Implementation Details

Figure 4:
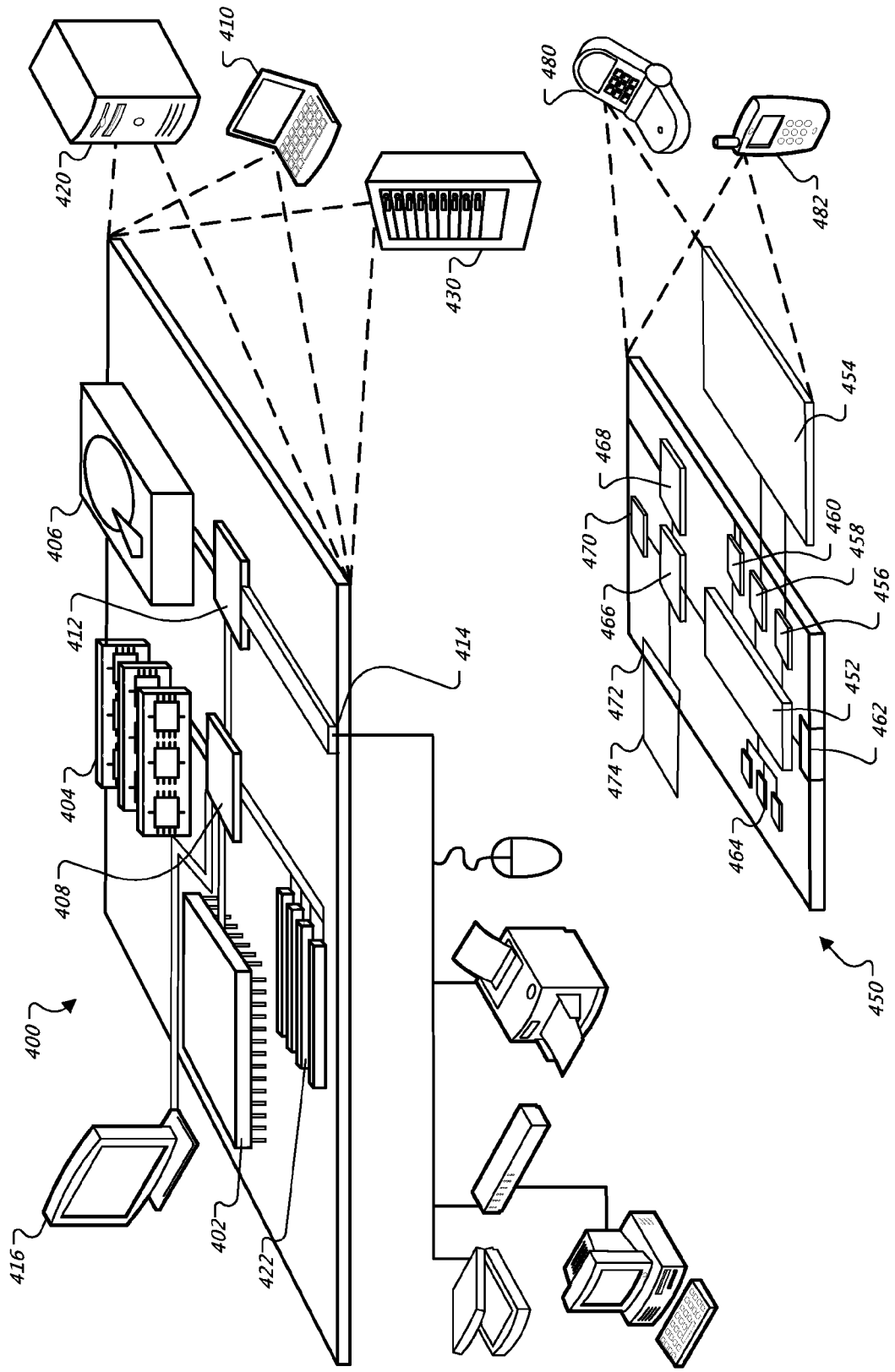
FIG. 4 is an example of a generic computer device and a generic mobile computer device.

FIG. 4 is an example of a generic computer device 400 and a generic mobile computer device 450, which may be used with the techniques described herein. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, tablets, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 422, and a low speed interface 412 connecting to low speed bus 414 and storage device 406. Each of the components 402, 404, 406, 408, 422, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 422, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 430. In addition, it may be implemented in a personal computer such as a laptop computer 410. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, from a user device, a search query for a content item, the search query including one or more search terms;
   identifying a corpus of content items previously delivered to the user device, wherein the content items included in the corpus of content items are advertisements corresponding to content sponsors;
   creating an index of the corpus of content items previously delivered to the user device, wherein the index of the corpus of content items previously delivered to the user device is populated of a cookie stored at the user device;
   using the received search terms to search the index of the corpus of content items;
   determining that at least one content item in the index corresponds to the received search terms; and
   delivering, to the user device, a content item search result, the content item search result including the at least one content item corresponding to the received search terms.

2. The method of claim 1, wherein using the received search terms to search the corpus of content items previously delivered to the user device comprises using the received search terms to search the index.

3. The method of claim 1, wherein cached copies of the content items included in the corpus of content items previously delivered to the user device are stored with the index.

4. The method of claim 1, wherein the content item search result list is ordered based on a time-stamp of prior delivery of the at least one content item to the user device.

5. The method of claim 1, wherein the corpus of content items were previously delivered to the user device by a content item management system.

6. A non-transitory computer storage medium encoded with a computer program, the program comprising instructions that when executed by data processing apparatus cause the data processing apparatus to perform operations comprising:
   receiving, from a user device, a search query for a content item, the search query including one or more search terms;
   identifying a corpus of content items previously delivered to the user device, wherein the content items included in the corpus of content items are advertisements corresponding to content sponsors;
   creating an index of the corpus of content items previously delivered to the user device, wherein the index of the corpus of content items previously delivered to the user device is populated of a cookie stored at the user device;
   using the received search terms to search the index of the corpus of content items; determining that at least one content item in the index corresponds to the received search terms; and delivering, to the user device, a content item search result, the content item search result including the at least one content item corresponding to the received search terms.

7. The non-transitory computer storage medium of claim 6, wherein using the received search terms to search the corpus of content items previously delivered to the user device comprises using the received search terms to search the index.

8. The non-transitory computer storage medium of claim 6, wherein cached copies of the content items included in the corpus of content items previously delivered to the user device are stored with the index.

9. The non-transitory computer storage medium of claim 6, wherein the content item search result list is ordered based on a time-stamp of prior delivery of the at least one content item to the user device.

10. The non-transitory computer storage medium of claim 6, wherein the corpus of content items were previously delivered to the user device by a content item management system.

11. A system comprising:
    one or more processing devices configured to perform operations comprising:
    receiving, from the user device, a search query for a content item, the search query including one or more search terms;
    identifying a corpus of content items previously delivered to the user device by the content item management system, wherein the content items included in the corpus of content items are advertisements corresponding to content sponsors;
    creating an index of the corpus of content items previously delivered to the user device, wherein the index of the corpus of content items previously delivered to the user device is populated of a cookie stored at the user device;
    using the received search terms to search the index of the corpus of content items;
    determining that at least one content item in the index corresponds to the received search terms; and
    delivering, to the user device, a content item search result, the content item search result including the at least one content item corresponding to the received search terms.

12. The system of claim 11, wherein the content item search engine uses the received search terms to search the index.

13. The system of claim 11, wherein cached copies of the content items included in the corpus of content items previously delivered to the user device are stored by the content item search engine.

14. The system of claim 11, wherein the content item search result list is ordered based on a time-stamp of prior delivery of the at least one content item to the user device.

15. The system of claim 11, wherein the user device comprises a personal computer running a web browser, a mobile telephone running a WAP browser, or a tablet computer running a web browser.

16. The system of claim 11, wherein one or more computers are operable to implement the content item search engine, the one or more computers comprising a server operable to interact with the user device through a data communications network, and the user device is operable to interact with the server as a user.

17. The system of claim 16, wherein the one or more computers consist of one computer, the user device is a user interface device, and the one computer comprises the user interface device.

* * * * *